United States Patent
Sakazaki

(10) Patent No.: US 9,406,242 B2
(45) Date of Patent: Aug. 2, 2016

(54) SKILL JUDGING DEVICE, SKILL JUDGING METHOD AND STORAGE MEDIUM

(71) Applicant: CASIO COMPUTER CO., LTD., Shibuya-ku, Tokyo (JP)

(72) Inventor: Naoyuki Sakazaki, Fussa (JP)

(73) Assignee: CASIO COMPUTER CO., LTD, Tokyo (JP)

(*) Notice: Subject to any disclaimer, the term of this patent is extended or adjusted under 35 U.S.C. 154(b) by 51 days.

(21) Appl. No.: 13/786,428

(22) Filed: Mar. 5, 2013

(65) Prior Publication Data
US 2013/0236869 A1    Sep. 12, 2013

(30) Foreign Application Priority Data
Mar. 7, 2012   (JP) .................. 2012-049931

(51) Int. Cl.
  G09B 15/00    (2006.01)
  G09B 19/00    (2006.01)
  G09B 5/04     (2006.01)
(52) U.S. Cl.
  CPC *G09B 19/00* (2013.01); *G09B 5/04* (2013.01); *G09B 15/002* (2013.01)

(58) Field of Classification Search
  CPC .................................... G09B 19/0015
  USPC ................... 434/247, 250, 257, 258
  See application file for complete search history.

(56) References Cited

U.S. PATENT DOCUMENTS

| | | | | |
|---|---|---|---|---|
| 5,515,079 A | * | 5/1996 | Hauck ................. | G06F 3/0386 345/157 |
| 2005/0098021 A1 | * | 5/2005 | Hofmeister et al. ........... | 84/453 |
| 2008/0014835 A1 | * | 1/2008 | Weston et al. ............... | 446/484 |
| 2012/0024128 A1 | * | 2/2012 | Takahashi ...................... | 84/600 |

FOREIGN PATENT DOCUMENTS

| | | |
|---|---|---|
| JP | 3599115 B2 | 12/2004 |
| JP | 2005-055635 A | 3/2005 |
| JP | 2007-078724 A | 3/2007 |
| JP | 4586525 B2 | 11/2010 |

* cited by examiner

*Primary Examiner* — Bruk Gebremichael
(74) *Attorney, Agent, or Firm* — Holtz, Holtz & Volek PC

(57) ABSTRACT

Every time a performance action is played with a performance appliance, a state of each performance action is detected. A degree of variations of the states of the performance actions is detected by using a variations sensor and a degree of skill of the performance action is judged and notified based on the result detected by the variations sensor.

3 Claims, 11 Drawing Sheets

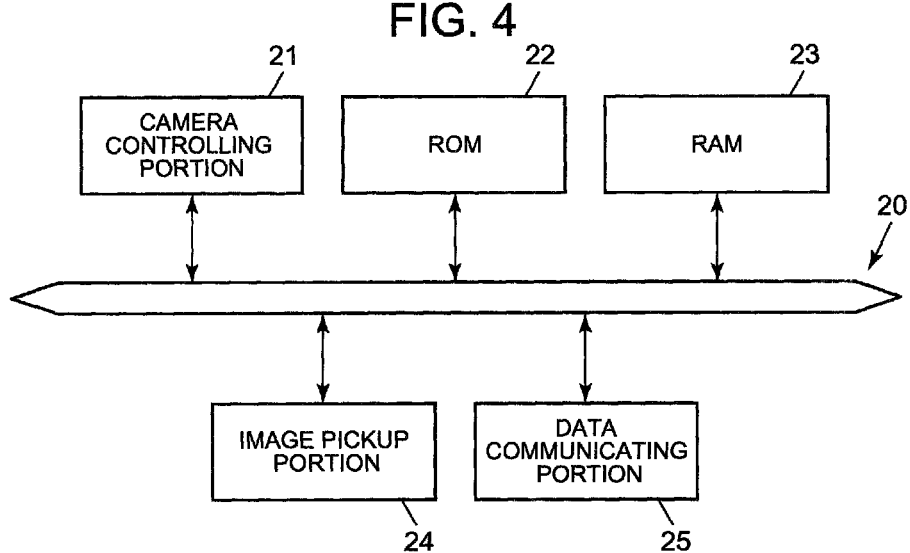
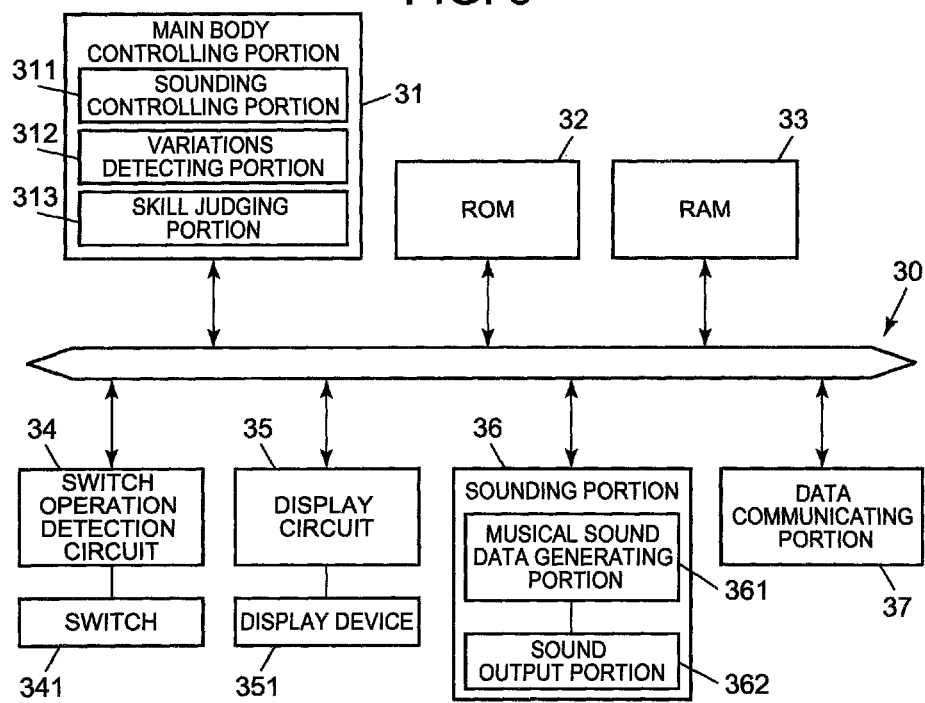

SKILL JUDGING DEVICE, SKILL JUDGING METHOD AND STORAGE MEDIUM

CROSS-REFERENCE TO RELATED APPLICATIONS

This application is based upon and claims the benefit of priority from the prior Japanese Patent Application No. 2012-49931, filed Mar. 7, 2012, and the entire contents of which are incorporated herein by reference.

BACKGROUND OF THE INVENTION

1. Field of the Invention

The present invention relates to a skill judging device, skill judging method and storage medium.

2. Description of Related Art

A musical sound generation device (musical instrument game machine) which can sound electronic sound (musical sound) corresponding to a performance action upon detecting the performance action by a player (user) has been proposed (JP Patent No. 3599115, for example). Among these devices that sound such electronic sound, a device (virtual drum instrument) is known (JP Patent No. 4586525, for example) that sounds percussion sound upon performing an action by a player to swing a handheld element (controller) which corresponds to a stick of a percussion instrument. Such a device is provided with a sensor in the controller and when a player swings the element in player's hand, the sensor detects the motion and the percussion sound is generated in accordance with the detected results.

Because an actual musical instrument such as a percussion instrument is heavy and requires enough space, it is difficult to play or have a practice of such an instrument casually in one's own house.

By virtue of a musical sound data generating device that can detect performance action of a player and generate musical sound in accordance with the action so as to play virtual instrumental performance, it will become possible to enjoy instrumental performance casually without restriction of a place or space for the performance because the musical sound can be generated without actual musical instruments.

SUMMARY OF THE INVENTION

Such a virtual musical instrumental device, however, generates predetermined musical sound by performing (playing) an action such as tapping a predetermined performance area in a space where nothing is actually present. Therefore, it is difficult to recognize where one should play an action to make desired musical sound or whether one could have played an action at an appropriate performance area until one becomes practiced in the performance. It means that it is difficult to practice an appropriate performance action.

The present invention was made in view of the circumstances and an object of the invention is to provide a skill judging device, skill judging method and a storage medium that can indicate, with ease to understand, a degree of practice of playing a virtual musical instrument.

According to an aspect of the invention, a skill judging device of an embodiment includes a state sensor which detects a state of each performance action every time the performance action is played, a variations sensor which determines a degree of variations of the states of the performance actions detected by the state sensor, a skill judging portion which judges a degree of skill of the performance action based on the result detected by the variations sensor, and a notification portion which notifies the result judged by the skill judging portion.

According to another aspect of the invention, a skill judging method of an embodiment includes steps of detecting a state of each performance action by a state sensor every time the performance action is played, determining a degree of variations of the states of the performance actions by using a variations sensor, judging a degree of skill of the performance action based on the result determined by the variations sensor, and notifying the judgment result of the degree of practice.

According to further aspect of the invention, a computer-readable storage medium of an embodiment stores a computer-executable program. The program includes operational instructions that cause a computer to detect a state of each performance action, by using a state sensor, every time the performance action is played, to determine a degree of variations, by using a variations sensor, of the states of the performance actions detected by the state sensor, to judge a degree of skill of the performance action based on the result detected by the variations sensor, and to notify the judgment result.

BRIEF DESCRIPTION OF THE DRAWINGS

FIG. 4 is a block diagram of a hardware structure of a camera unit section in FIG. 1, FIG. 5 is a block diagram of a hardware structure of a center unit section in FIG. 1.

DETAILED DESCRIPTION OF PREFERRED EMBODIMENTS (First Embodiment)

A first embodiment of the present invention will be explained with reference to the drawings. It should be noted that embodiments explained hereafter include various technical restrictions to carry out the invention; however, such embodiments and the drawings are not intended to limit the present invention to the embodiments and the drawings.
(Summary of Skill Judging Device)

At first a summary of an embodiment of the invention will be explained with reference to FIG. 1A and FIG. 1B.

Figure 1A:
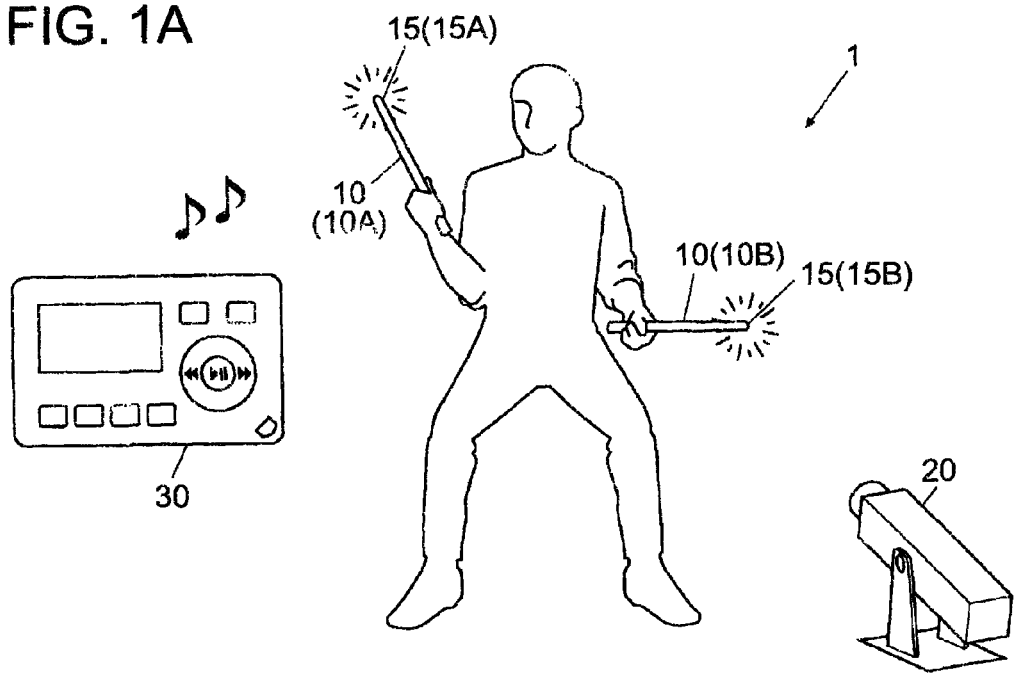
FIG. 1A is a drawing illustrating an embodiment of a skill judging device of the present invention.

FIG. 1A is a drawing illustrating a schematic structure of a skill judging device of a first embodiment.

As shown in FIG. 1A, the skill judging device 1 of a first embodiment includes stick sections 10A and 10B, a camera unit section 20 and a center unit section 30. The skill judging device 1 of a first embodiment includes two stick sections 10A and 10B so as to realize virtual drum-set performance with two drum-sticks. However, the number of sticks is not limited and one stick section or three or more stick sections are applicable. The two stick sections 10A and 10B are designated as "stick section 10" hereafter when they are explained together.

The stick section 10 is a rod-shaped member extending in its longitudinal direction, and functions as a performance appliance that a player can hold in player's hand. Specifically, a player grips one end (base side) of the stick section 10 and plays a performance action by swing up and swing down about a player's wrist, for example.

At the other end (tip side) of the stick section 10 of a first embodiment is provided with various sensors such as an acceleration sensor, and the like (motion sensor portion 14, see FIG. 2) to detect the performance action by the player.

A detection result detected by the sensor (e.g. raw data obtained by the sensor) is transmitted to the center unit section 30.

A marker portion 15 is provided at the tip side of the stick section 10 so as to make the camera unit section 20 recognize the tip of the stick section 10 easily.

The camera unit section 20 is an imaging device provided with an image pickup portion 24 (e.g. optical camera, see FIG. 4) that can capture moving images of a player playing performance action with the stick section 10 at a predetermined frame rate. In a first embodiment, the camera unit section 20 functions as a state sensor that can detect a state of the performance action every time the performance action is played. According to a first embodiment, the camera unit section 20 as a state sensor captures images, by the image pickup portion 24, of the stick section 10 (more specifically, the marker portion 15 of the stick section 10) as the performance appliance as a subject. The camera unit section 20 also includes a camera controlling portion 21 as a position detecting means that can detect a position coordinates of the stick section 10 (performance appliance) at every timing the stick section 10 (performance appliance) is played and each of the position coordinates of the stick section 10 at the detected performance play can be detected as a state of the performance action.

The center unit section 30 receives a detection result of the sensor (motion sensor portion 14 which will be explained later) from the stick section 10. Upon receiving the detection result, the center unit section 30 makes a sounding portion 36, as a sounding means of predetermined musical sound, send out the musical sound through a sound output portion 362 such as a speaker in accordance with the detection result and the position coordinates of the marker portion 15 at the reception time of the detection result.

Figure 1B:
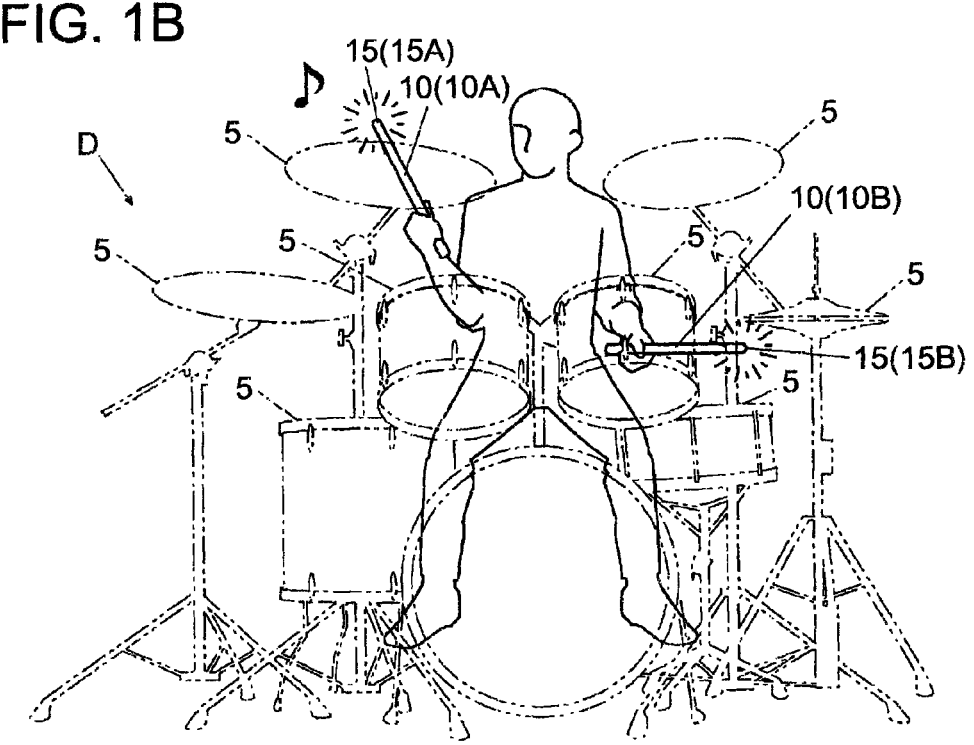
FIG. 1B is a virtual drum set of an embodiment.

Specifically, the center unit section 30 stores position coordinates data of a virtual drum-set D, as shown in FIG. 1B, in relation to an imaging space of the camera unit section 20 in a ROM (described later), for example, as a memory means. The center unit section 30, based on the position coordinates data of the virtual drum-set D and the position coordinates of the marker portion 15 at the reception time of the result detected by the motion sensor portion 14, determines an instrument which the stick section 10 tapped and makes the sound output portion 362 sound predetermined musical sound corresponding to the instrument.

According to a first embodiment, a degree of variations of the states of performance actions detected by the camera unit section 20 as a state sensor is detected and the degree of skill of the player is judged based on the detected degree of variations.

The skill judging device 1 of a first embodiment will be explained in details hereafter.
(Structure of Skill Judging Device 1)

The stick section 10, camera unit section 20 and center unit section 30 that structure the skill judging device 1 of a first embodiment will be explained in details with reference to FIGS. 2 to 5.

Figure 2:
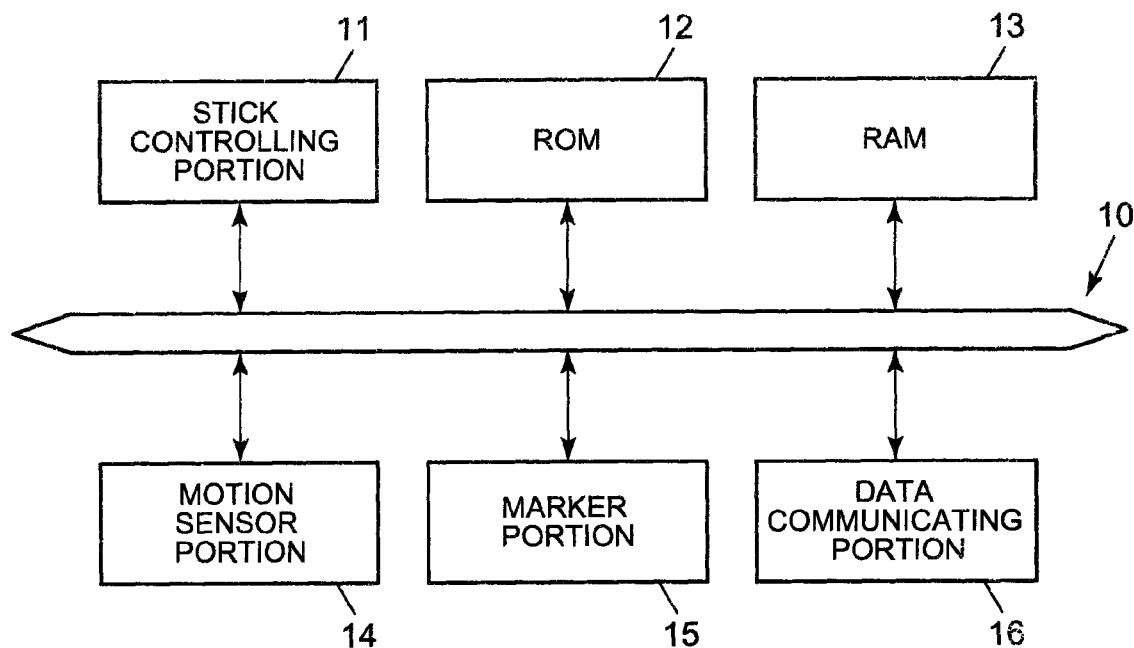
FIG. 2 is a block diagram of a hardware structure of a stick section in FIG. 1.
Figure 3:
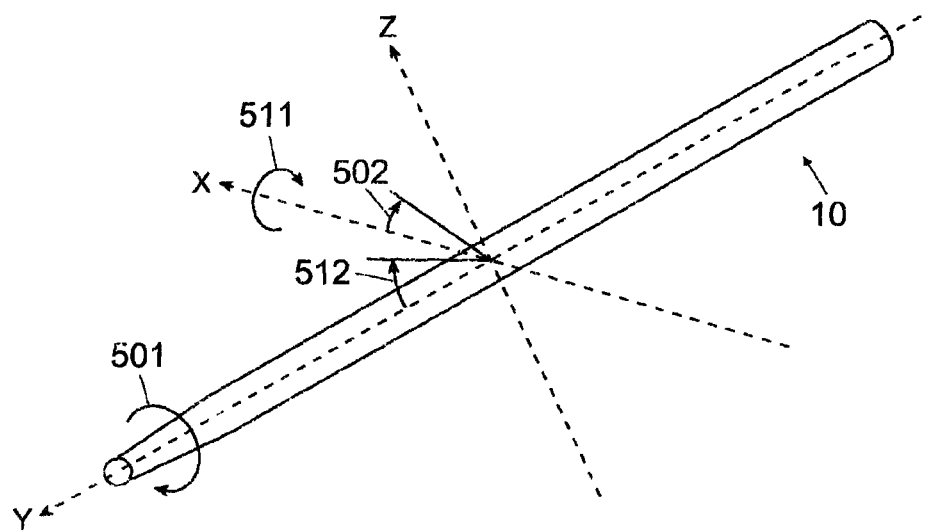
FIG. 3 is a perspective view of a stick section in FIG. 1.

FIG. 2 is a block diagram of a hardware structure of the stick section 10, FIG. 3 is a perspective view of the stick section 10, FIG. 4 is a block diagram of a hardware structure of the camera unit section 20 and FIG. 5 is a block diagram of a hardware structure of the center unit section 30.
(Structure of Stick Section 10)

The stick section 10 includes a stick controlling portion 11 composed of such as a CPU (central Processing Unit), ROM (Read Only Memory) 12, RAM (Random Access Memory) 13, motion sensor portion 14, marker portion 15 and data communicating portion 16. The stick section 10 is provided with a power portion (not shown) that supplies electrical power to each portion.

The ROM 12 stores various processing programs by which the stick controlling portion 11 executes various processing.

The ROM 12 stores marker feature information for use of light emission control for the marker portion 15.

The marker feature information is information, when multiple marker portions 15 exist in the same imaging space, to distinguish each marker portion 15 (a first marker of the stick section 10A and a second marker of the stick section 10B in a first embodiment). The marker feature information may be a shape, size, color phase (tint), chroma or brightness as well as flashing speed of the light. When multiple stick sections 10 are provided, each of the stick sections 10 has its own marker feature information and is controlled to emit light according to the marker feature information.

The RAM 13 stores various values obtained and/or generated in the processing such as sensor values output from the motion sensor portion 14.

The stick controlling portion 11 controls the whole of the stick section 10.

The stick controlling portion 11 controls communication between the center unit section 30. For example, when a sensor value as a detection result by the motion sensor portion 14 (called as "motion sensor data" hereafter) is output from the motion sensor portion 14, the stick controlling portion 11 transmit the motion sensor data to the center unit section 30 through the data communicating portion 16.

The stick controlling portion 11 reads the marker feature information from the ROM 12 and controls the emission of light of the marker portion 15 in accordance with the marker feature information. As explained above, when multiple stick sections 10A and 10B are provided, each of the stick sections 10A and 10B is controlled to emit light according to the different marker feature information. By virtue of the control, it becomes possible to detect the marker portion 15 (first marker) of the stick section 10A and the marker portion 15 (second marker) of the stick section 10B separately. If the marker portions 15 emit light in the same manner, when multiple stick sections 10 are provided, there may be a risk that the marker portions 15 cannot be distinguished to which stick section 10 the marker portion belongs when they are captured by the camera unit section 20. Therefore, the stick controlling portion 11 of the stick section 10A and the stick controlling portion 11 of the stick section 10B, respectively, read different marker feature information and control to emit light differently from the marker portions 15 so as to be distinguishable between the marker portions 15 easily.

The control by the stick controlling portion 11 is not limited to them. The stick controlling portion 11 may control the on/off light emission of the marker portion 15 based on an instruction from the center unit section 30 or sensor values (motion sensor data) as a detection result by the motion sensor portion 14.

The motion sensor portion 14 is provided inside the stick section 10, for example, and includes a plurality of sensors to detect the state (e.g. swing down position, swing down speed, and swing down angle) of the stick section 10. The motion sensor portion 14 outputs predetermined sensor values (motion sensor data) as the results of the detection. The results of the detection (motion sensor data) detected by the motion sensor portion 14 are transmitted to the center unit section 30 through the data communicating portion 16.

An acceleration sensor, angular speed sensor, magnetic sensor and the like may be used as the sensors included in the motion sensor portion 14.

A three-axis sensor that can output acceleration in X-axis, Y-axis and Z-axis directions may be used as the acceleration sensor. As shown in FIG. 3, the Y-axis may be a longitudinal axis of the stick section 10, the X-axis may be an axis that is parallel to a substrate (not shown) on which the sensor is provided and is orthogonal to the Y-axis, and the Z-axis may be an axis that is orthogonal to the X-axis and the Y-axis. The acceleration sensor may calculate a resultant sensor value which is obtained by combining all of the acceleration values while obtaining each acceleration component of the X-axis, Y-axis and Z-axis.

According to a first embodiment, when performing with the skill judging device 1, a player holds an end portion (base side) of the stick section 10 and moves the other end (tip side) of the stick section 10 up and down about the player's wrist (swing up and swing down) to cause a rotating movement of the stick section 10. The acceleration sensor will calculate the resultant acceleration sensor value of more than the gravitational acceleration (1G) when the stick section 10 rotates, while the acceleration sensor will calculate the resultant acceleration sensor value corresponding to the gravitational acceleration (1G) when the stick section 10 is in a still state. The resultant acceleration sensor value may be obtained by, for example, calculating a square root of the sum of the squares of each acceleration component of X-axis, Y-axis and Z-axis.

A sensor having a gyroscope, for example, may be used as an angular speed sensor. In a first embodiment, the angular speed sensor outputs a rotation angle 501 in Y-axis direction and a rotation angle 511 in X-axis direction of the stick section 10, respectively, as shown in FIG. 3.

The rotation angle 501 about Y-axis is a rotation angle about a fore-and-aft axis with respect to the player having the stick section 10 and therefore the rotation angle can be called as a roll angle. The roll angle corresponds to an angle 502 which indicates a degree of inclination of the X-Y plane with respect to X-axis and is generated by rotating the stick section 10 right and left about a player's wrist.

The rotation angle 511 about X-axis is a rotation angle about side-to-side axis with respect to the player having the stick section 10, and therefore the angle can be called as a pitch angle. The pitch angle corresponds to an angle 512 which indicates a degree of inclination of the X-Y plane with respect to Y-axis and is generated by swinging the player's wrist with the stick section 10 up and down.

The angular speed sensor may also output a rotation angle about Z-axis (not shown). The rotation angle about Z-axis has the same property as that of the rotation angle 511 about X-axis and corresponds to a pitch angle which is generated by swinging the player's wrist with the stick section 10 in right and left directions.

A magnetic sensor which can output magnetic sensor values in three directions of X-axis, Y-axis and Z-axis, shown by FIG. 3, may be used as the magnetic sensor. Such a magnetic sensor outputs vectors indicating north direction in each of the X-axis, Y-axis and Z-axis directions. Because each output component of the axis directions differs depending on a posture (direction) of the stick section 10, the stick controlling portion 11 can calculate the roll angle and the rotation angles about X-axis and Z-axis of the stick section 10 based on the components.

Next, a detection result (motion sensor data) detected by the motion sensor portion 14 will be explained with reference to FIG. 6. The detection result is a result of an acceleration sensor among the sensors above explained.

When a player plays with the stick section 10, the player performs the same action as when the player plays an actual instrument such as a drum. At first, in such a performance, the player raises the stick section 10 and then swings down towards a virtual surface of a virtual instrument. And the player exerts the stick section 10 a force to stop the movement just before the virtual instrument because the surface does not actually exist.

Figure 6:
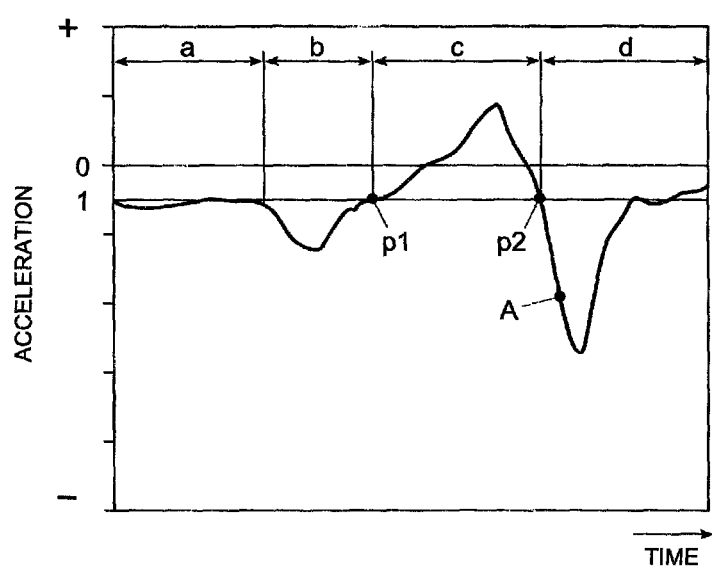
FIG. 6 is a graph illustrating an acceleration change in vertical direction of a motion sensor portion.

FIG. 6 is an example of the motion sensor data, transmitted to the center unit section 30 from the stick section 10, indicating the change of a vertical acceleration of the motion sensor portion 14 when the player having the stick section 10 performed such a performance action.

The vertical acceleration is an acceleration component in vertical direction with respect to the horizontal plane and can be calculated by decomposing the acceleration component of Y-axis. Or the vertical acceleration may be calculated by decomposing the acceleration component in Z-axis direction (or acceleration component in X-axis direction, depending on the roll angle). In FIG. 6, negative acceleration value means acceleration exerted to the stick section 10 in a downward direction and positive acceleration value means acceleration exerted to the stick section 10 in an upward direction.

When the stick section 10 is in a still state (a portion designated by "a" in FIG. 6), the motion sensor portion 14 of the stick section 10, which is still against the gravitational acceleration, detects the acceleration in downward direction, that is negative direction, because the gravitational acceleration is exerted on the stick section 10. When the stick section 10 falls free, the acceleration exerted on the stick section 10 becomes zero.

Next, when the player lifts up the stick section 10 as a swing up motion from the still state, the acceleration exerted to the stick section 10 increases in negative direction, as shown by an interval designated as "b" in FIG. 6, because the motion opposes the gravitational acceleration. After that when the player reduces the lift up speed to stop the stick section 10, the acceleration turns from a negative direction to a positive direction and when the lift up motion reached to the highest speed (point "p1" in FIG. 6), only the gravitational acceleration (1G) is remained.

After reaching to the peak point of the stick section 10, the player swings down the stick section 10, as shown by an interval "c" in FIG. 6. The acceleration exerted to the stick section 10 increases in the positive direction than the gravitational acceleration because the stick section 10 moves along the gravity direction during the swing down motion. When the swing down motion reaches to the highest speed, only the gravitational acceleration (1G) is exerted to the stick section 10, again (point "p2" in FIG. 6).

After that the stick section 10 is lifted up and the exerted acceleration turns to increase to the negative direction, and when the lift up motion is tried to stop, the exerted acceleration turns to the positive direction from the negative direction, as shown by an interval "d" in FIG. 6.

The change of the acceleration, as shown in FIG. 6, is repeated in accordance with the lift up motion and the swing down motion of the stick section 10 by the player during the performance and the acceleration change is detected by the motion sensor portion 14.

Now return to FIG. 2. The marker portion 15 is a light-emitting body such as a LED, for example, provided at a tip side of the stick section 10. The marker portion 15 emits a light and turns off the light in accordance with the control of the stick controlling portion 11.

Specifically, the marker portion 15 emits a light based on the marker feature information read from the ROM 12 by the stick controlling portion 11. As explained above, the marker feature information of the stick section 10A and the stick section 10B are different. As a result, as explained later, the camera unit section 20 can distinguish the marker portion of the stick section 10A (first marker) and the marker portion of the stick section 10B (second marker) and acquire position coordinates of the marker portions of both of the stick sections distinctly.

The data communicating portion 16 communicates with at least the center unit section 30 by predetermined wireless communication. Any method is available for the predetermined wireless communication, and infrared communication is exemplified for the wireless communication with the center unit section 30 in a first embodiment. The data communicating portion 16 may communicate with the camera unit section 20 or with the stick sections 10A and 10B. The type of the communication by the data communicating portion 16 is not limited to the wireless communication. The stick section 10 and the center unit section 30 may be connected by a cable and the data communicating portion 16 may use the cable communication.

(Structure of Camera Unit Section 20)

Next, a structure of the camera unit section 20 will be explained with reference to FIG. 4.

The camera unit section 20 includes a camera controlling portion 21 composed of a CPU, for example, ROM 22, RAM 23, image pickup portion 24 and data communicating portion 25. The camera unit section 20 includes a power portion (not shown) for supplying power to each portion.

The ROM 22 stores processing programs for various processing executed by the camera controlling portion 21.

The RAM 23 stores values obtained and/or generated by the processing such as data indicating the position of the marker portion 15 obtained by the image pickup portion 24 (e.g. images of the player playing a virtual drum), data of position coordinates of the marker portions 15 (first marker and second marker) of the stick section 10A and 10B calculated from the position data, and the like.

The RAM 23 stores marker detection condition information transmitted from the center unit section 30. The marker detection condition information is condition information to distinguish the marker portions 15 of the stick sections 10A and 10B and generated from marker feature information by a main body controlling portion 31 of the center unit section 30.

The camera controlling portion 21 controls the whole of the camera unit section 20.

In a first embodiment, the camera controlling portion 21 executes marker position detection processing for calculating each position of the marker portions 15 (first marker and second marker) of the stick sections 10A and 10B based on, for example, the marker detection condition information and data indicating the position of the marker portion 15 obtained by the image pickup portion 24 (image data containing at least an area around the stick section 10 including the marker portion 15 such as an image of the player having the stick section 10 and playing the virtual instrument).

That is, the camera controlling portion 21 functions as a position sensor which detects coordinates of a position of the performance appliance on a captured image plane (position coordinates of the marker portion 15 of the stick section 10 in the imaged space) by detecting the marker portion 15 of the stick section 10 in the image obtained by the image pickup portion 24 at every timing that the stick section 10 (performance appliance) is operated. Thus the camera controlling portion 21 structures a state sensor with the image pickup portion 24. When a plurality of marker portions 15 of the stick sections 10A and 10B are detected, the camera controlling portion 21 reads the marker detection condition information from the RAM 23 and distinguishes the marker portion 15 (first marker) of the stick section 10A and the marker portion 15 (second marker) of the stick section 10B. And the camera controlling portion 21 detects each of the position coordinates of the detected stick sections 10 (performance appliance) as each state of the performance action.

The camera controlling portion 21 executes transmission control for transmitting the data of respective calculated position coordinates of the marker portions 15 (first marker and second marker) of the stick section 10A and 10B to the center unit section 30 via the data communicating portion 25 (the data of the position coordinates of the distinguished first marker and second marker is designated as "detected marker position information" hereinafter).

The image pickup portion 24 is an optical camera, for example, that can capture images containing stick section 10 (performance appliance) containing at least the marker portion 15, as a subject, at a predetermined frame rate. The picked up images are, for example, moving images of the player having the stick section 10 and performing a performance action.

In a first embodiment, the image pickup portion 24 structures a state sensor which detects a state of the performance action at every time the performance action is performed by the player.

The state of the performance appliance based on the performance action by the player and detected by the image pickup portion 24 means a performance position of the stick section 10 (performance appliance) at the time of the performance action.

The performance position of the stick section 10 (performance appliance) at the time of the performance action means a position of a performance surface of the virtual instrument (in the case of a drum, tapping surface to be tapped by the stick section 10) where the stick section 10 is swung down at the time of the performance action, and a position of the marker portion 15 at the tip of the stick section 10 at a shot-timing which will be explained later.

The image data of each frame picked up by the image pickup portion 24 is output to the camera controlling portion 21. Identification of the position coordinates of the marker portion 15 of the stick section 10 in the imaging space is executed by the camera unit section 20. However, the identification of the position coordinates of the marker portion 15 (marker position detecting processing, see FIG. 15) may be executed by the image pickup portion 24 or the camera controlling portion 21. A discrimination process that discriminate the marker portions 15 (the first marker and second marker) of the stick sections 10A and 10B in the captured image may be executed by the image pickup portion 24 or the camera controlling portion 21.

The data communicating portion 25 communicates with at least the center unit section 30 by predetermined wireless communication (infrared communication, for example). In a first embodiment, the data communicating portion 25 receives the marker detection condition information from the center unit section 30. The data communicating portion 25 transmits the detected marker position information to the center unit section 30.

The data communicating portion 25 may communicate with the stick section 10 by wireless communication. The communication method is not limited to wireless communication. The camera unit section 20 and the center unit section 30 may be connected by a cable and they may be communicated with each other by the data communicating portion 25.

(Structure of Center Unit Section 30)

Next, the structure of the center unit section 30 will be explained with reference to FIG. 5.

The center unit section 30 includes a main body controlling portion 31 composed of a CPU and the like, ROM 32, RAM 33, switch operation detection circuit 34, display circuit 35, sounding portion 36 and data communicating portion 37. The center unit section 30 includes a power portion (not shown) to supply power to each portion as well.

The ROM 32 stores various processing programs to be executed by the main body controlling portion 31.

The ROM 32 stores waveform data of various sounds (sound source data of each instrument), e.g. waveform data of percussion instruments composing the assumed virtual drum set D (FIG. 1B) of a first embodiment such as a bass drum, high hat, snare, cymbals, tam, and the like. The stored waveform data is associated with the position coordinates of the instruments in the spatial performance area 5 (see FIG. 2, for example). The ROM 32 may store waveform data of sounds of wind instruments such as a flute, sax and trumpet, keyboards such as a piano, and stringed instruments such as a guitar as well as percussion instruments.

The RAM 33 stores information of a state of the stick section 10 received from the stick section 10, that is, the detection result (motion sensor data) of the motion of the stick section 10 (performance appliance) detected by the motion sensor portion 14 of the stick section 10, respective position coordinates data (detected first marker position information and detected second marker position information), received from the camera unit section 20 as a detecting means, of respective marker portion 15 (first marker and second marker) of the stick sections 10A and 10B, and the like.

The RAM 33 stores the marker feature information, transmitted from the stick sections 10A and 10B, of the marker portion 15 (first marker) of the stick section 10A and the marker portion 15 (second marker) of the stick section 10B.

The main body controlling portion 31 controls the whole of the center unit section 30.

According to a first embodiment, the main body controlling portion 31 includes a sounding controlling portion 311, variations detecting portion 312, skill judging portion 313, and the like from the viewpoint of a functionality. The functions of the sounding controlling portion 311, variations detecting portion 312, skill judging portion 313, and the like are exerted by the cooperation with the CPU and the programs stored in the ROM 32, and the like.

The sounding controlling portion 311 is a musical sound generation instructing means that instructs to generate predetermined musical sound every time the player plays a performance action with the stick section 10 (performance appliance). The sounding controlling portion 311 gives a direction to the sounding portion 36 as a sounding means to generate predetermined musical sound when an action position of the stick section 10 as the performance appliance, at the performance action, is within a predetermined performance area 5.

Specifically, the sounding controlling portion 311 gives a sounding signal (note on event) to the sounding portion 36, as a sounding means, to generate predetermined musical sound in accordance with the detection result (motion sensor data) of the motion of the stick section 10 (performance appliance) detected by the motion sensor portion 14 as a detecting means and the detected marker position information transmitted from the camera unit section 20. The note on event (sounding signal) includes information such as a shot timing (sounding timing), sound level, tone of the sound (type of instrument), and the like.

More specifically, upon receiving the detection result (motion sensor data) of the motion of the stick section 10 (performance appliance) detected by the motion sensor portion 14 and transmitted from the stick section 10 (performance appliance), the sounding controlling portion 311 detects the state of the stick section 10, held by the player, such as a direction and an angle (that may be said as a performance state by the player) based on the transmitted data. The sounding controlling portion 311 detects timing of a tap (shot timing) on the virtual instrument by the stick section 10 based on the acceleration data (or synthesized data) output from the acceleration sensor.

The detection of the shot timing by the sounding controlling portion 311 will be explained with reference to FIG. 6.

As explained above, FIG. 6 is a graph illustrating the acceleration change in vertical direction of the motion sensor portion 14 when the player performed a performance action with the stick section 10.

Since the player expects generation of musical sound at the moment the stick section 10 is shot on the virtual instrument, it is preferable that the skill judging device 1 can generate the musical sound at the timing the player expects. Therefore, the skill judging device 1 of a first embodiment generates the musical sound at the moment or slightly before the moment the player strikes the tapping surface of the virtual instrument with the stick section 10.

According to a first embodiment, the sounding controlling portion 311 of the center unit section 30 detects a moment that the lift, up motion is started just after the end of the swing down motion which determines the moment of impact on the tap surface of the virtual instrument with the stick section 10. That is, in the interval d in FIG. 6, the sounding controlling portion 311 detects a point of time "A" as the shot timing (sounding timing), where acceleration is increased by predetermined value in a negative direction from the still state, that is, the acceleration is only gravitational acceleration (point p2 in FIG. 6).

And the sounding controlling portion 311 generates the note on event (sounding signal) so as to generate the musical sound at the time the shot timing is detected.

The sounding controlling portion 311 detects a speed and strength of the swing down motion of the stick section 10 by the player, a position and an angle of the swung stick section 10, and the like based on the detection result (motion sensor data) of the motion of the stick section 10 (performance appliance) detected by the motion sensor portion 14. In a first embodiment, when controlling the sounding portion 36, the sounding controlling portion 311 takes the detected marker position information of the marker portions 15 (first marker and second marker) of the stick sections 10A and 10B received from the camera unit section 20 into consideration as well as the detection result (sensor values) of the motion of the stick section 10 (performance appliance) detected by the motion sensor portion 14.

The sounding controlling portion 311 generates note on events corresponding to the player's action. That is, the sounding controlling portion 311 judges as to which instrument is tapped by how fast, how strong and what timing based on the motion sensor data and the detected marker position information, reads waveform data corresponding to an instrument in accordance with the judgment from the ROM 33 and outputs the sounding signals (note on events) to the sounding portion 36 so as to sound the predetermined musical sound in a sound level in accordance with the speed and the strength of the tapping at the predetermined shot timing.

The variations detecting portion 312 is a variations detecting means (variations sensor) to detect the variations of the performance action based on the states of the stick section 10 (performance appliance) detected by the image pickup portion 24 of the camera unit section 20.

The skill judging device 1 of a first embodiment is selectable for a normal performance mode and a skill judging mode which judges a skill (degree of practice) of the player. When the skill judging mode is selected, the variations detecting portion 312 detects the degree of variations of the performance actions based on the states of the stick section 10 (performance appliance) expressed by the detected marker position information of the first marker and the second marker received from the camera unit section 20.

In a first embodiment, the variations detecting portion 312 detects variations of the amount of shift of action positions of the stick section 10 (performance appliance) during the performance action from an action target position defined in the predetermined performance area 5, which is termed as the degree of variations of the performance actions.

Figure 7A:
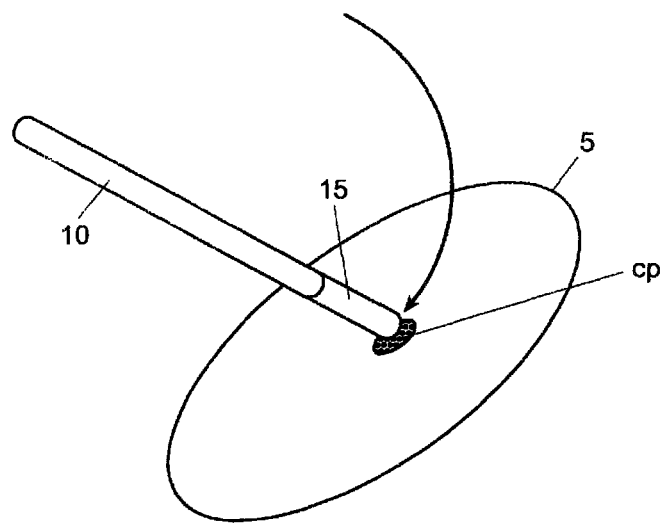
FIG. 7A is a schematic drawing illustrating a tapping of an action target position on a virtual hitting surface of a percussion instrument with a stick section.

The action target position is, for example, a center point "cp" in the predetermined performance area 5 as shown in FIG. 7A.

Figure 7B:
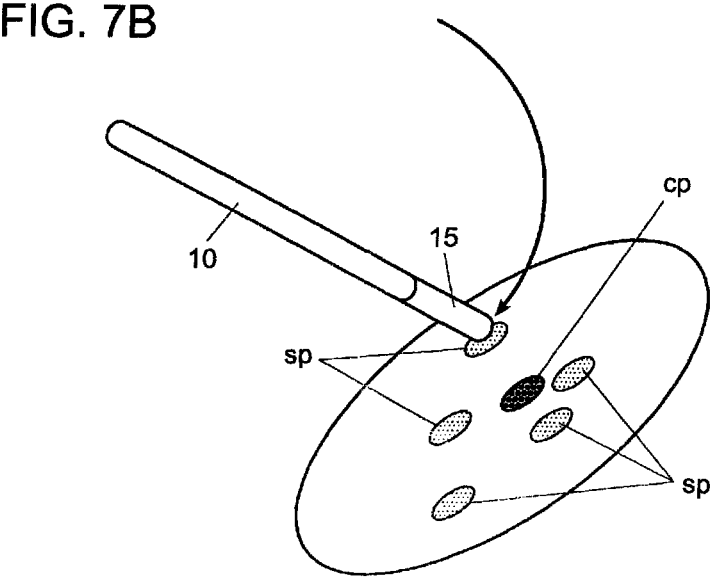
FIG. 7B is a schematic drawing illustrating multiple acting positions when a virtual hitting surface of a percussion instrument is hit in multiple number of times with a stick section.

The action position of the stick section 10 (performance appliance) during the performance action is, for example, a position of the tip portion of the stick section 10 (performance appliance) at the shot timing determined by the detected marker position information of the first marker and the second marker received from the camera unit section 20 as explained above and shown as a performed position "sp" in FIG. 7B.

The amount of shift of performed position from the action target position is, for example, a linear distance between the center point "cp" of the performance area 5 as the action target position and the action position "sp".

The variations detecting portion 312 detects how degree the action position "sp" is shifted from the center point "op" of the performance area 5 as the action target position for each shot based on the detection result obtained by the detecting means and stores the data in the RAM 33, for example. The determination of the amount of shift is executed, for example, by comparing the position coordinates of the center point "cp" and the position coordinates of the action position "sp".

The skill judging portion 313 is a skill judging means to judge the player's skill of performance based on the detected data by the variations detecting portion 312 as a variations detecting means (variations sensor).

The skill judging portion 313 calculates the sum of the amounts of shifts from the center point "cp" of predetermined number of shots, e.g. ten shots, detected by the variations detecting portion 312 and judges whether or not the sum is over a predetermined threshold value. Four threshold values are provided, for example, and the skill judging portion 313 judges such that if the sum is not larger than the first threshold, the player's skill is the highest level 5, if the sum is over the first threshold and not larger than the second threshold, the skill is level 4, if the sum is over the second threshold and not larger than the third threshold, the skill is level 3, if the sum is over the third threshold and not larger than the fourth threshold, the skill is level 2, and if the sum is over the fourth threshold, the skill is the lowest level 1.

The number of thresholds or skill levels is not limited to this example. For example, a threshold value is provided and it may be judged such that if the sum of the amount of shift is not larger than the threshold, the skill is good and if the sum is over the threshold, the skill is poor.

The method to judge the skill of performance by the skill judging portion 313 is not limited to this example. For example, an average of the amounts of shifts of the shots from the center point "cp" detected by the variations detecting portion 312 may be calculated and the skill may be judged by determining whether or not the average value is over a predetermined threshold.

The main body controlling portion 31 controls communication between the stick section 10 and the camera unit section 20 via the data communicating portion 37.

According to a first embodiment, the main body controlling portion 31 receives the motion sensor data from the stick section 10 and receives the detected marker position information of the first marker and the second marker from the camera unit section 20, respectively, via the data communicating portion 37.

The main body controlling portion 31 generates the marker detection condition information based on the marker feature information and transmits the marker detection condition information to the camera unit section 20 via the data communicating portion 37.

The switch operation detection circuit 34 is connected with a switch 341 and receives input information through the switch 341. The input, information includes, for example, change of a sound level or a tone of the musical sound and change of display in a display device 351. In a first embodiment, as explained above, a normal performance mode and a skill judging mode are selectable by instructing a mode change through the switch 341. Upon inputting of information of the mode change through the switch 341, the switch operation detection circuit 34 receives the input information, and the main body controlling portion 31 changes the mode according to the input information.

The data communicating portion 37 communicates between the stick section 10 and the camera unit section 20 by predetermined wireless communication (infrared communication, for example).

The display circuit 35 is connected with the display device 351 and controls the display device 351.

The display device 351 is a display means composed of a liquid crystal display (LCD) and the like, for example.

In a first embodiment, the display device 351 displays a judgment by the skill judging portion 313, that is, the display device 351 functions as a notification means to notify a judgment result judged by a skill judging means.

Figure 8A:
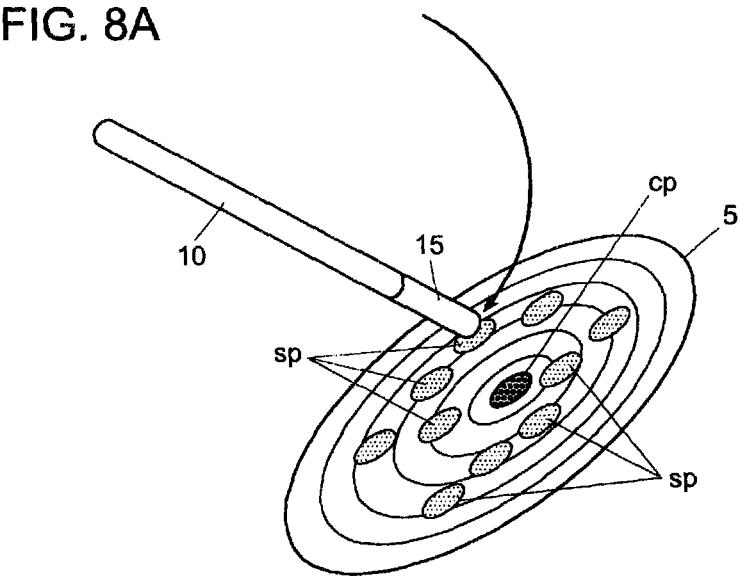
FIG. 8A is a schematic drawing illustrating ten acting positions when a virtual hitting surface of a percussion instrument is hit in ten times with a stick section.
Figure 8B:
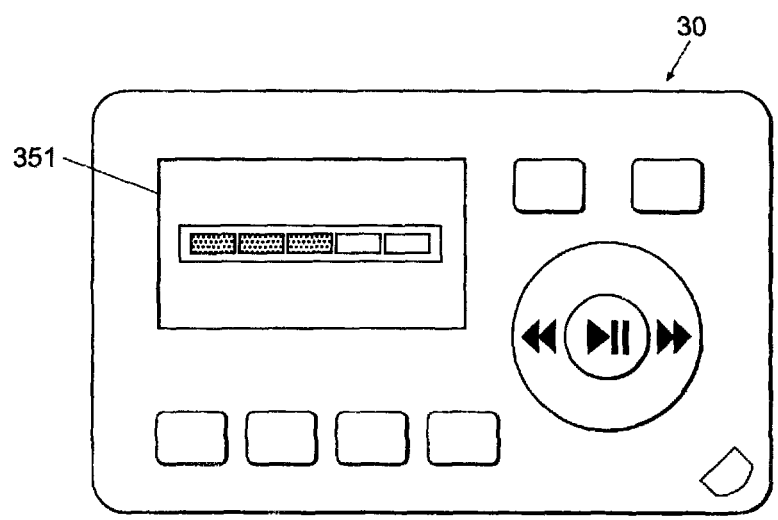
FIG. 8B is an example of a plan view of a display portion indicating a degree of practice when performance actions are played as shown in FIG. 8A, FIGS. 9A to 9C are examples of a screen of a display device showing action positions when a virtual hitting surface of a percussion instrument is hit in multiple number of times with a stick section.

For example, supposing that the player acted ten performance actions (shots) and the action position "sp" of each shot in the virtual performance area 5 was detected as shown by FIG. 8A, and when the skill judging portion 313 judged that the player's skill level is 3, an indicator screen, on which three stage lamps is lit among five stage lamps as shown by FIG. 8B, is displayed on the display device 351. The display style indicating the result is not limited to the example. For example, some words such as "your level is 3" may be displayed instead on the display device 351.

When the skill judging mode is selected, the action position "sp" of each performance action (shot) played by the player may be displayed at any time on the display device 351.

Figure 9A:
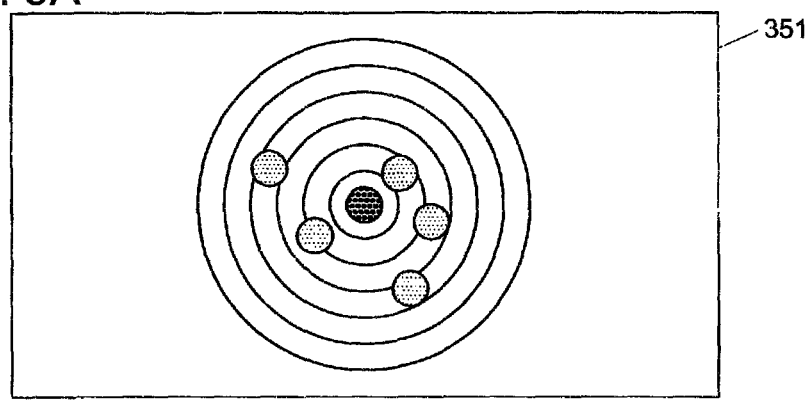
Figure 9B:
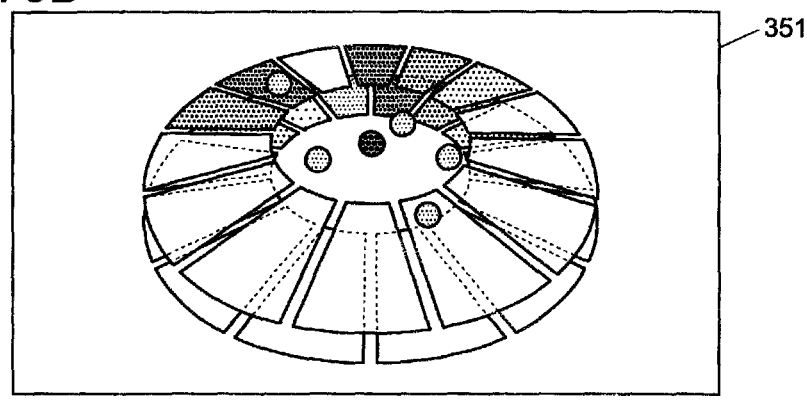

For example, it may be possible to display the action position "sp" of each performance action defined by the detected marker position information as a plane coordinates on the display device 351, as shown in FIG. 9A, by being superimposed on an image illustrating concentric circles about the center point "cp" of the performance area (striking area) 5 as the action target position.

It is also possible to display the action position "sp" of each performance action defined by the detected marker position information as a plane coordinates on the display device 351, as shown in FIG. 9E, by being superimposed on an image illustrating three-dimensional doughnut-shaped performance area (striking area) 5 about the center point "cp".

Figure 9C:
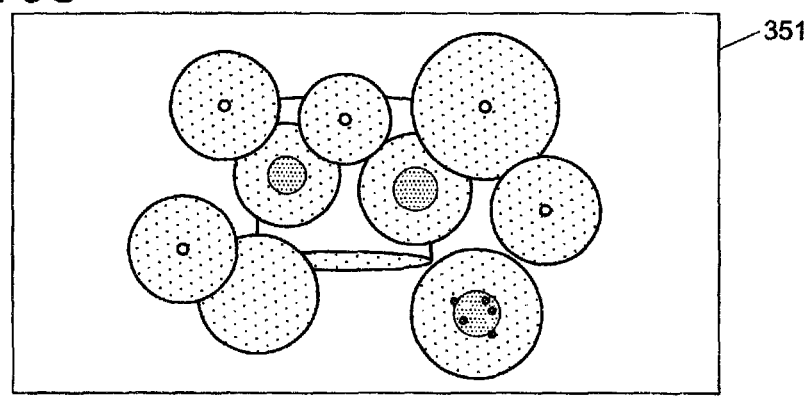

Or following example will be possible as shown in FIG. 9C. That is, an image illustrating a plan view of the virtual drum set D is displayed on the display device 351. When the performance action is played by the player, a color of the performance area (striking area) 5 of an instrument corresponding to the performance action is changed, or an image superimposing the performance position "sp" of each performance action defined by the detected marker position information on the virtual drum set D is displayed on the display device 351.

The sounding portion 36 is a sounding means to sound a predetermined musical sound and includes a musical sound data generating portion 361 and a musical sound output portion 362.

The musical sound data generating portion 361 is a functional portion that reads waveform data from the ROM 32 based on an instruction by the sounding controlling portion 311, generates musical sound data and converts the generated musical sound data into analog signals.

The musical sound output portion 362 is a speaker, for example, and sounds musical sound based on the musical sound data generated by the musical sound data generating portion 361. The musical sound output portion 362 is not limited to a speaker but an output terminal and the like to output the musical sound to a headphone, for example.

(Processing in Skill Judging Device 1)

Next, the processing in the skill judging device 1 will be explained with reference to FIGS. 10 to 12.

Figure 10:
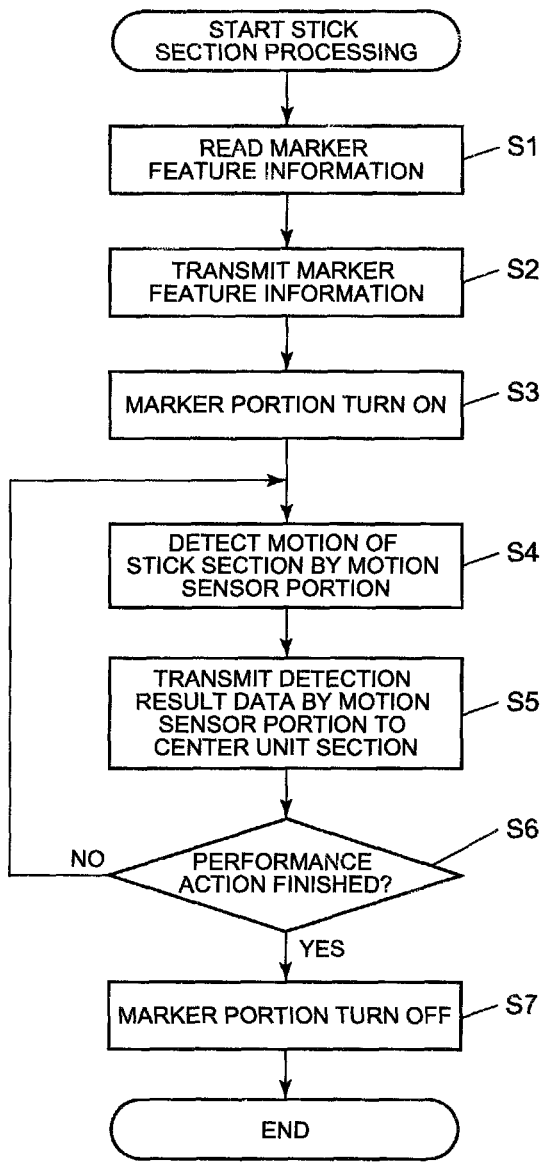
FIG. 10 is a process flowchart for a stick section.
Figure 11:
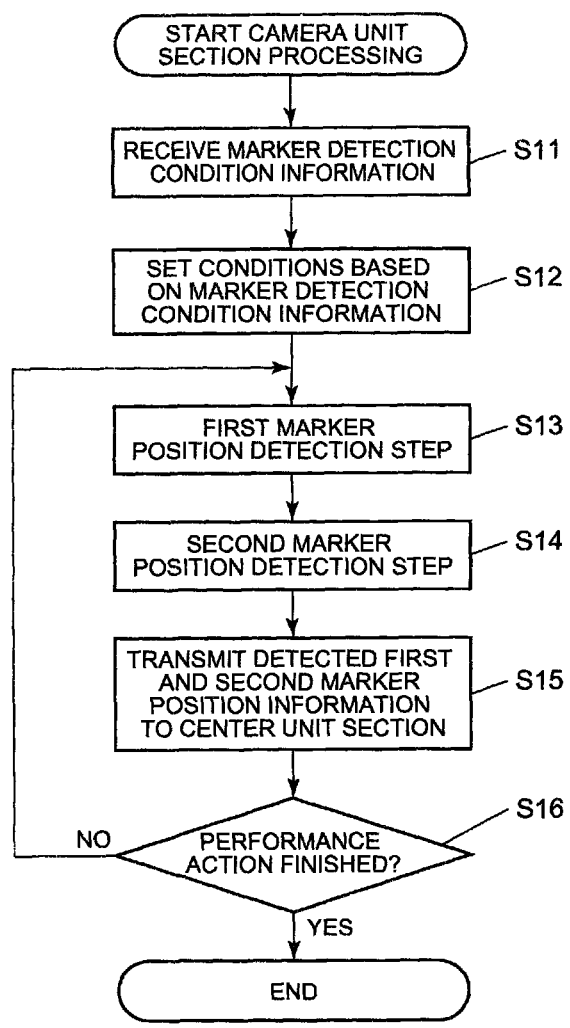
FIG. 11 is a process flowchart for a camera unit section.
Figure 12:
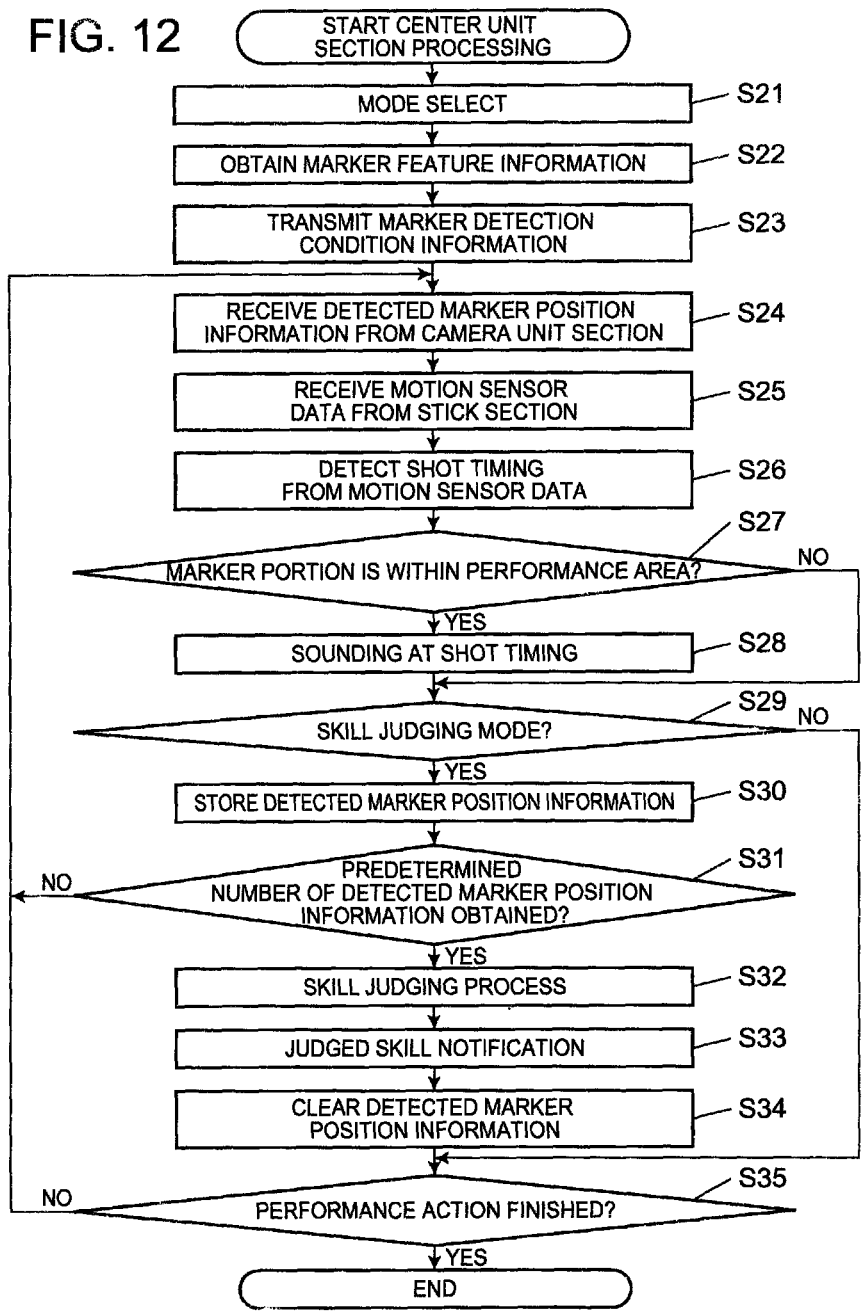
FIG. 12 is a process flowchart for a center unit section.

FIG. 10 is a process flowchart for the stick section 10, FIG. 11 is a process flowchart for the camera unit section 20 and FIG. 12 is a process flowchart for the center unit section 30.

(Processing for Stick Section 10)

As shown in FIG. 10, the stick controlling portion 11 of the stick section 10 reads the marker feature information stored in the ROM 12 (step S1). Each stick controlling portion 11 of the stick sections 10A and 10B reads different marker feature information, respectively, in this step. The reading of the different marker feature information may be carried out in any way. The stick section 10A and 10B may communicate with each other directly or via the center unit section 30, for example. Or each stick section 10 may have unique marker feature information and the stick controlling portions 11 of the stick sections 10A and 10B may read the assigned respective marker feature information.

The stick controlling portions 11, upon reading the marker feature information, stores the marker feature information in the RAM 13 and transmits to the center unit section 30 through the data communicating portion 16 (step S2). The stick controlling portions 11 transmits the marker feature information such that the information is associated with the identification information (stick identification information) for distinguishing the stick sections 10A and 10B to the center unit section 30.

The stick controlling portions 11 turns on the marker portion 15 in accordance with the marker feature information (step S3).

Next, the stick controlling portions 11 reads motion sensor data, that is, sensor values (detection results) output from various sensors, from the motion sensor portion 14 and stores the data in the RAM 13 (step S4). After that, the stick controlling portions 11 transmits the read motion sensor data to the center unit section 30 through the data communicating portion 16 such that the data is associated with the stick identification information (step S5).

The stick controlling portions 11 decides whether or not a series of performance actions is finished (step S6) and when decided that the performance actions are finished (step S6: YES), the stick controlling portions 11 turns off the marker portion 15 (step S7). The stick controlling portions 11 may judge that the performance actions are finished in the case where the sensor value output from the motion sensor portion 14 changes smaller than a predetermined value, where a switch (not shown) of the stick section 10 is turned off or where a signal indicating an end of performance is transmitted from the center unit section 30, for example. On the other hand, when the stick controlling portions 11 judged that the performance actions are not finished (step S6: NO), the process goes to step S4 and repeats the processing.

(Processing at Camera Unit Section 20)

As shown in FIG. 11, the camera controlling portion 21 of the camera unit section 20 acquires the marker detection condition information transmitted from the center unit section 30 and stores the information in the RAM 23 (step S11). The marker detection condition information is a condition to detect each of the marker portions 15 of the stick sections 10A and 10B and generated from the marker feature information (see steps S22 and S23 in FIG. 12). The marker feature information may be a shape, size, color, color saturation, brightness, and the like of the marker.

Next, the camera controlling portion 21 sets various conditions of the image pickup portion 24 based on the marker detection condition information (step S12).

Next, the camera controlling portion 21 controls the image pickup portion 24 so as to acquire an image containing the marker portion 15 of the stick section 10, and the like, by a camera of the image pickup portion 24 and executes a first marker position detection processing (step 913) and a second marker position detection processing (step S14). The camera controlling portion 21 acquires the detected marker position information such as a position coordinates, size, angle, and the like (information of position of the performance appliance of an embodiment at the time of action) of each of the marker portion 15 (first marker) of the stick section 10A and the marker portion 15 (second marker) of the stick section 10B from the image acquired by the image pickup portion 24, and stores the information in the RAM 23.

Next, the camera controlling portion 21 transmits the detected marker position information obtained at step S13 and step S14 to the center unit section 30 through the data communicating portion 25 (step S15).

The camera controlling portion 21 decides whether or not a series of performance actions is finished (step S16) and when it is decided that the performance actions are finished (step S16: YES), the processing is ended. When it is decided that the performance actions are not finished (step S16: NO), the processing returns to step S13 and is repeated.

(Processing at Center Unit Section 30)

At first, as shown in FIG. 12, the normal performance mode or the skill judging mode is set by a manual operation using the switch 341. The mode setting is not limited to the input from the switch 341. It may be configured such that the normal performance mode is selected when no mode setting is input and when the skill judging mode is input, the mode is selected.

The main body controlling portion 31 of the center unit section 30 receives the marker feature information from the stick section 10 and stores the information in the RAM 33 (step S22). Next, the main body controlling portion 31 generates the marker detection condition information based on the marker feature information and detection condition set through the switch 341, and transmits the information to the camera unit section 20 through the data communicating portion 37 (step S23).

Next, the main body controlling portion 31 receives the detected marker position information of the first marker and the second marker from the camera unit section 20 and stores the information in the RAM 33 (step S24). The main body controlling portion 31 receives the motion sensor data such as posture information associated with the stick identification information, shot information, action information and the like from each of the stick sections 10A and 10B and stores the data in the RAM 33 (step S25).

Next, the sounding controlling portion 311 detects the shot timing on the basis of the received motion sensor data (step S26). Specifically, supposing that the motion sensor data is as shown in FIG. 6. When a swing down action of the stick section 10 after lift up action exists (point "A" in FIG. 6 exists), the sounding controlling portion 311 detects a point of time just starting a lift up action after the swing down action as a shot timing (sounding timing). And when the shot timing is detected, the sounding controlling portion 311 decides whether or not the action position of the shot "sp" (position of the marker portion 15 at the time of shot) is within the predetermined performance area (shot area) 5 (step S27). When it is decided that the action position (shot position) "sp" is within the predetermined performance area 5 (step S27: YES), the sounding controlling portion 311 outputs the sounding signal (note on event) to the sounding portion 36 so as to sound the musical sound of the instrument corresponding to the performance area 5 at the shot timing. As a result, predetermined musical sound is output from the sound output portion 362 such as a speaker (step S28). When it is decided that the action position of the shot is not within the performance area 5 (step S27: NO), the sounding signal is not output and goes to the next step.

The main body controlling portion 31 decides whether the skill judging mode is selected (step S29), and when decided that the skill judging mode is selected (step S29: YES), the main body controlling portion 31 stores the detected marker position information (coordinates of the action position of the stick section 10) of the shot in the PAM 33 and the like (step S30). The main body controlling portion 31 decides whether the number of the detected marker position information stored in the RAM 33, for example, reached a predetermined number (ten times, for example) or not, that is, the predetermined number of shots are completed during the skill judging mode and the predetermined number of the action positions "sp" are stored or not (step S31). When the predetermined number of detected marker position information (action positions "sp") are not stored (step S31: NO), the main body controlling portion 31 repeats the processing from step S24.

When decided that the predetermined number (ten, for example) of detected marker position information (action positions "sp") are stored (step S31: YES), the processing goes to the skill judging step (step S32).

Specifically, an amount of shift of the action position "sp" from the center point "cp" is detected by the variations detecting portion 312 as a variations detecting means. The skill judging portion 313 sums up the amount of shifts detected by the variations detecting portion 312 and decides whether or not the sum exceeds predetermined threshold values. Four threshold values are provided, for example, and the skill judging portion 313 decides such that when the sum is not larger than the first threshold value, the skill, is the highest level 5, when the sum is over the first threshold value and not larger than the second threshold value, the skill is level 4, when over the second threshold value and not larger than the third threshold value, the skill is level 3, when over the third threshold value and not larger than the fourth threshold value, the skill is level 2, and when over the fourth threshold value, the skill is the lowest level 1.

After deciding the skill of the player by the skill judging portion 313, a screen showing the result is displayed on the display device 351 to notify the result to the player (step S33).

After deciding the skill for the predetermined number of shots (ten, for example) by the skill judging portion 313, the coordinates data of the action positions "sp" (detected marker position information) is deleted from the RAM 33 (step S34).

When the skill judging mode is not selected (in the case where a normal performance mode is selected, step S29: NO) or when the skill judging steps are ended during the skill judging mode and the detected marker position information is deleted (step S34), the main body controlling portion 31 decides whether or not the performance is finished (step S35). When decided that the performance is finished (step S35: YES), the sounding step is ceased. When decided that the performance is not finished (step S35: NO), the main body controlling portion 31 repeats the steps from step S24.

According to the skill judging device 1 of a first embodiment, it becomes possible to detect degree of variations of performance actions based on a state of the stick section 10 (performance appliance) detected by the image pickup portion 24 as a detecting means to detect the state of the stick section 10 (performance appliance) as a result of the performance action by the player and to judge a degree of skill of the player based on the detected degree of variations of the performance actions. By virtue of the device, even a beginner who plays a virtual instrument by tapping a space where nothing is actually existing, and is not skilled in the instrument, can recognize how degree the player's performance is advancing to ideal performance. As a result, the device can assist such a player to practice the instrument.

A player can easily recognize the player's own skill since the judging result of the skill is notified to the player by a notification on the display device 351, for example.

According to a first embodiment, the detecting means detects the action position "sp" at the performance action of the stick section 10 as a state of the stick section 10 (performance appliance) as a result of the performance by the player. The variations detecting portion 312 detects the variations of the degree of shift of the action point "sp" from the action target position (center point "cp") defined in the performance area 5 as a degree of variations of the performance actions. Therefore, the player can recognize easily from the judging result whether he(she) is tapping a proper position so that he(she) would understand how to improve the player's skill, e.g. how degree he(her) should correct the action point "sp".

In addition, according to a first embodiment, a normal performance mode is selectable as well as the skill judging mode. When the action position "sp" of the stick section 10 (performance appliance) at the performance action is within the predetermined performance area 5, predetermined musical sound corresponding to the performance action is output from the sounding portion 36, e.g. speaker, to enjoy playing a usual instrument.

According to a first embodiment, the camera unit section 20 composed of an image pickup portion 24, camera controlling portion 21, and the like functions as a state sensor to detect a state of the performance action every time the performance action is performed. However, the detecting means is not limited to the camera unit section 20.

The sensors such as the motion sensor portion 14 of the stick section 10 may function as the state sensor instead of the camera unit section 20 or with the camera unit section 20 to detect a state of the performance action every time the performance action is performed. In such a case the motion sensor portion 14 such as a magnetic sensor detects an action position of the stick section 10 at a performance action as the state of the stick section 10 (performance appliance) as a result of the player's action based on a direction and an angle of the tip of the stick section 10, for example.

When the sensors (motion sensor portion 14) of the stick section 10 plays a role as the detecting means instead of the image pickup portion 24, the skill judging device 1 may not include the camera unit section 20 having the image pickup portion 24.

The action target position is assumed at the center point "cp" of the performance area 5 in a first embodiment; however, the action target position is not limited to the center point. For example, the action target position may be an area including the center point "cp" (an area where proper musical sound will be made if there be an actual instrument). In this case, the variations detecting portion 312 detects as to whether or not the action position is within the action target position and stores the number of shots which is out of the action target position in the RAM 33, and the like. The skill judging portion 313 judges the skill of the performance based on the result detected by the variations detecting portion 312 such that when the number of shots out of the action target position is equal to a predetermined threshold value or larger, the skill judging portion 313 judges the skill is poor, for example.

In a first embodiment the action target position is set on the center point "cp" of the performance area 5. However, it may be possible to provide multiple levels of the skill judgment. For example, a predetermined area (where proper musical sound will be made if there be an actual instrument) including the center point "cp" is set as the action target position for a beginner's level and only the center point "cp" is set as the action target position for as a strict criterion to judge the level of skill.

In a first embodiment single action target position (e.g. center point "cp") is set in the performance area 5. However, it may be possible to set multiple action target positions in the performance area 5 and judge the skill for each position.

Since different musical sound will be made when tapped at a center portion and at an edge portion of the same tapping surface of an actual instrument, a good player makes different musical sound intentionally by tapping different positions. It becomes possible to judge a skill of the performance which is close to an actual instrument by providing multiple action target positions in the performance area 5 and judging the skill for each position.

(Second Embodiment)

Next, a second embodiment of the skill judging device of the invention will be explained. Because a method to judge a skill as different from that of a first embodiment, the different points will be mainly explained below.

A skill judging device of a second embodiment is provided with a stick section 10, camera unit section 20 and a center unit section 30, as is the same as a first embodiment.

According to a second embodiment a state sensor to detect a state of a performance action every time the performance action is played is a motion sensor portion 14 provided in the stick section 10. The motion sensor portion 14 as a state sensor, provided in the stick section 10 (performance appliance), has a speed sensor to detect a moving speed exerted to a main body of the stick section 10 (performance appliance) every time a performance action is played and detects the moving speed of each performance action as the state of each performance action.

The moving speed of each performance action of the stick section 10 is a moving speed of the stick section 10 for each swing down motion and can be detected by an acceleration detected by an acceleration sensor, for example.

In a second embodiment a variations detecting portion as a variations detecting means (variations sensor) detects a degree of variations of states of performance actions of the stick section 10 detected by the detecting means, e.g. motion sensor portion 14 (acceleration sensor).

Specifically, the variations detecting portion detects as to whether the measured data, which indicates a moving state of the stick section 10 at the performance action, such as an acceleration detected by the acceleration sensor is within a predetermined range or not and detects the number of the measured data within the predetermined range as a degree of variations of the performance actions. The predetermined range means a range that, when the performance is within the range, it can be regarded that the performance was almost the same and a concrete value is set as appropriate.

A method which detects a degree of variations by the variation detecting portion is not limited to the embodiment. It may be possible, for example, to collect predetermined number of performance actions, e.g. ten times, and compare measured data, e.g. acceleration data, of the ten performance actions so as to detect a degree of shift of each data instead of specifying a predetermined value.

A skill judging portion as a skill judging means judges a degree of practice of performance action based on the result (the degree of variations of measured data indicating a moving state of the stick section 10 at a performance action) detected by the variations detecting portion.

When a performance skill of a player is in a high level, a performance form, tapping power control and the like during a performance of the same instrument becomes constant and thus the measured data indicating the moving state of the stick section 10 at the performance action, e.g. acceleration detected by an acceleration sensor, tend to gather at a constant value. Therefore, it is possible to judge a performance skill of the player by analyzing how degree the measured data (e.g. measurement value of the acceleration sensor) corresponding to moving speeds of multiple performance actions gather to a constant value.

Specifically, the skill judging portion judges the performance skill by deciding whether or not the number of measured data detected by the variations detecting portion within a predetermined value is over a predetermined threshold value. As explained in a first embodiment the threshold value may be one or more. When multiple threshold values are assigned, the skill judging portion judges the performance skill in multiple levels such that when the number of measured data within a predetermined value is seven or more, the skill level is high, when the number is four or more and smaller than seven, the skill level is middle, and when the number is smaller than four, the skill is beginner's level, for example.

Since the other structures are the same as those of a first embodiment, the same member is designated as the same symbol and an explanation thereof is omitted.

Next, functions of the skill judging device 1 of a second embodiment will be explained.

In a second embodiment, since a processing other than a process to judge performance skill (steps S30 to S34 in FIG. 12) is the same as that of a first embodiment, an explanation thereof is omitted.

When a skill judging mode is selected, in a second embodiment, a main body controlling portion stores data for each shot relating to a moving speed of the stick section 10 (acceleration data measured by an acceleration sensor, for example) in a RAM, for example.

The main body controlling portion decides whether or not a predetermined number of stored measured data is accumulated and when decided that the predetermined number (e.g. ten) of measured data for performance actions is accumulated, goes to the skill judging process.

In the skill judging process, the variations detecting portion decides whether each measured data is within a predetermined range or not and the number of data outside the predetermined range is counted. Next, the skill judging portion decides as to whether or not the number of data outside the predetermined range is over a predetermined value based on the result counted by the variations detecting portion. The skill judging portion judges the performance skill be high when the number of data is not larger than the threshold value and low when the number of data is over the threshold value.

The judged skill is notified to the player by displaying the judgment result on a display device, for example.

After completion of the skill judging process and notification of the judgment result, the measured data stored in the RAM and used for the skill judging process is deleted. If a series of performance action is finished, the processing is terminated and when the performance is not finished, new data (e.g. detected marker position information and motion sensor data) is received from the camera unit section and the stick section and processed in the same manner.

According to the skill judging device 1 of a second embodiment, the motion sensor portion 14 as a detecting means detects a state of the stick section 10 (performance appliance) as a result of a performance action by the player and a degree of variations is detected based on the detected states of the stick section 10. The performance skill of the player is then judged based on the degree of variations. By virtue of the device, as explained in a first embodiment, even a beginner who plays a virtual instrument by tapping a space where nothing is actually existing, and is not skilled in the instrument, can recognize how degree the player's performance is advancing to ideal performance. As a result, the device can assist such a player to practice the instrument.

Since the motion sensor portion 14 of the stick section 10 functions as a state sensor to detect a state of a performance action every time the performance action is played, the skill judging process can be executed without camera unit section In a second embodiment, various sensors (motion sensor portion 14) of the stick section 10 function as a detecting means to detect a moving speed of the stick section 10 at the performance action, which indicates a state of the stick section 10 (performance appliance) as a result of the performance action by the player. However, the detecting means is not limited to the motion sensor portion 14.

For example, an image pickup portion 24 of the camera unit section 20 may function as a detecting means to detect a state of the performance appliance as a result of the performance action by the player instead of or with the motion sensor 14. In this instance a moving speed of the stick section 10 can be detected from images that are continuously acquired, for example.

An exemplary embodiment above explained is a mere example of the present invention and not for limiting the invention. It should be noted that a detailed structure, each element or each operation of the device of an exemplary embodiment above explained can be modified within the gist of the present invention.

For example, any processing to be carried out in the stick section 10, camera unit section 20 or center unit section 30 may be executed in the other unit (stick section 10, camera unit section 20 or center unit section 30).

Specifically, a stick controlling portion 11 of the stick section 10 (performance appliance) may function as a musical sound generating instruction means, variations detecting means and skill judging means and analysis of measured data of various sensors may be carried out in the stick controlling portion 11. In this instance a note on event (sounding signal) based on the detected result by the various sensors is transmitted to the center unit section 30 instead of detected result itself (raw data of the sensors) obtained by the motion sensor portion 14 as a detecting means.

In another embodiment, a CPU 31 of the center unit section 30 may calculate position coordinates of the marker portions 15 (first marker and second marker) of the stick sections 10A and 10B based on data indicating position data (image data containing the player) of the marker portions 15 detected by the image pickup portion 24 of the camera unit section 20 and the marker feature information. In this instance the marker detection condition information to identify each marker portion 15 of the stick section 10A or 10B need not to be stored in the RAM 23 of the camera unit section 20 since, it is sufficient for the camera unit section 20 simply to capture images and send them to the center unit section 30.

In a second embodiment the display device 351 functions as a notification means to notify the judgment result obtained by the skill judging means; however, the notification means is not limited to the display device 351.

For example, an indicator for indicating the skill judgment result by the number of lit lamps or a color of a lamp may be provided beside the display device 351.

Figure 13:
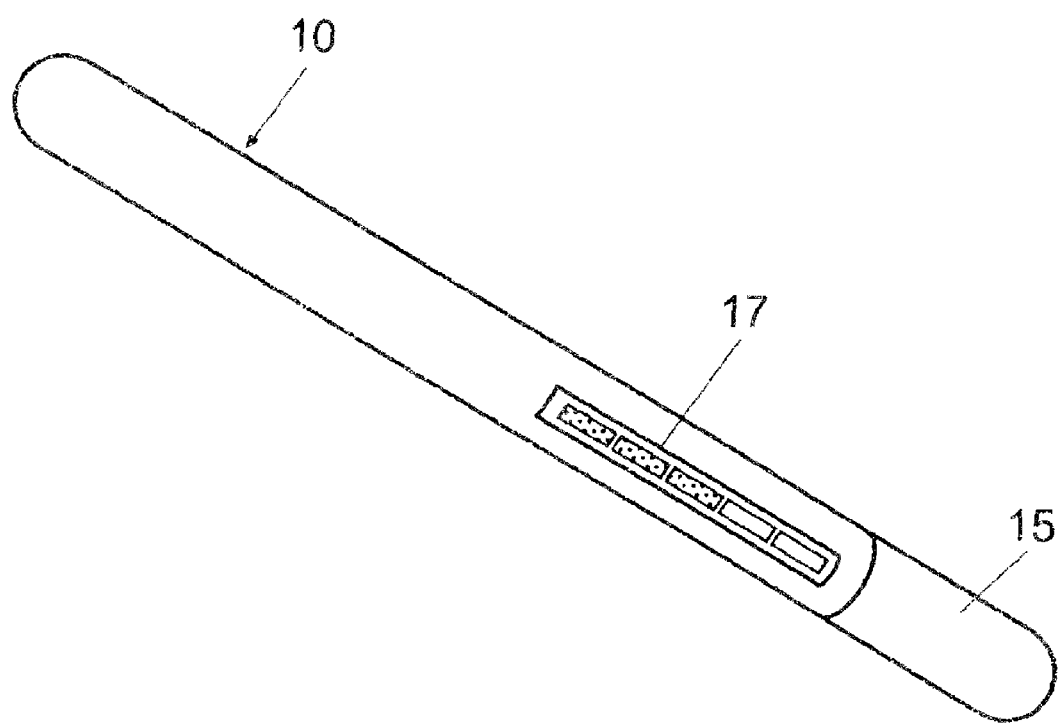
FIG. 13 is a perspective view of a stick section by an example that a degree of practice is displayed in a display portion of the stick section.

An indicator 17 or the like indicating the skill judgment result may be provided on the stick section 10 as shown in FIG. 13.

Further, the judgment result may be pronounced from a sound output portion 362 of a sounding portion 36 instead of or with the display device 351.

In an embodiment the skill judging device 1 has a normal performance mode as well as a skill judging mode. However, a skill judging device 1 may be a practice-only device having only a skill judging mode. In this instance the sounding portion 36 does not need to be provided.

In an embodiment the sounding process is carried out according to the performance action even when the skill judging mode is selected. However, it may be possible, when the skill judging mode is selected, not to carry out the sounding process and carry out the notification of the skill only by a display or sound.

In an embodiment acceleration data measured by an acceleration sensor is exemplified as motion sensor data obtained by the motion sensor portion 14 as a detecting means. However, the motion sensor data is not limited to that but may be an angular acceleration data obtained by a gyroscope, for example.

In an embodiment a rotation about an axis parallel to the stick section 10 is not considered. However, such a rotation may be taken into consideration by using a sensor such as an angular acceleration sensor.

In an embodiment the skill judging device 1 includes the motion sensor portion 14 of the stick section 10 and the image pickup portion 24 of the camera unit section 20 as a detecting means to detect a state (e.g. swing down position, swing down speed and swing down angle) of the stick section 10 (performance appliance) as a result of the performance action by the player. However, a detecting means is not limited to those. A pressure sensor may be provided as the motion sensor portion 14, for example, and sensors using laser, ultrasonic wave or the like for measuring a distance or an angle may be provided as well as image sensors provided in the image pickup portion 24 as a detecting means to detect the marker portion 15.

In an embodiment a drum set D (FIG. 1B) is assumed as a virtual instrument. However, the present invention can be applied to other instruments, e.g. a xylophone by which musical sound is generated by a swing down action of the stick section 10.

In an embodiment the sounding portion 36 as a sounding means is provided in the center unit section 30; however, the sounding means may be separated from the center unit section 30. In such a case the sounding means and the center unit section 30 is connected by wire or wireless and the sounding means generates predetermined sound according to an instruction signal from the center unit section 30.

In an embodiment the performance appliance is the rod-shaped stick section 10; however, the performance appliance is not limited to that. The performance appliance may be other than stick-shaped such as box-shaped, e.g. portable terminal equipment such as a mobile phone.

Because the skill judging device 1 generates musical sound by playing performance action e.g. by tapping the performance appliance in space, not by tapping the performance appliance on an actual instrument, even when a precision electronic equipment is used for the performance appliance, the performance appliance will not be damaged.

In an embodiment the stick section 10, camera unit section 20 and center unit section 30 have power supply portions of their own internally. However, the stick section 10, camera unit section 20 and center unit section 30 may be connected to an outer power supply to receive power from outside.

It should be noted that the scope of the present invention is not limited to the exemplary embodiments above explained but includes the scope of the original claims as well as the present claims and equivalents thereof.

What is claimed is:

1. A skill judging device comprising:
   a musical sound generation instructing unit which instructs generation of a predetermined musical sound to a sound output unit, every time a performance action is played with a performance appliance;
   a position sensor which captures an image of the performance appliance as a subject, and which detects position coordinates of the performance appliance on an image plane of the image every time the performance action is played with the performance appliance;
   a variations sensor which detects an amount of shift of each of the position coordinates detected by the position sensor from a target position defined in a predetermined performance area;
   a skill judging unit which calculates a sum of the amounts of the shifts from the target position of a predetermined number of the performance actions, and which judges one of a plurality of predetermined ranges within which the sum belongs, wherein each of the plurality of predetermined ranges represents a skill level based on a degree of a performance action variation;
   a notification unit which notifies a result judged by the skill judging unit; and
   a display device which displays the position coordinates of each performance action as plane coordinates on the display device by being superimposed on an image illustrating concentric circles about a center point corresponding to the target position of the performance area.

2. A skill judging method for a skill judging device, the method comprising:
   instructing generation of a predetermined musical sound to a sound output unit, every time a performance action is played with a performance appliance;
   capturing an image of the performance appliance as a subject, and detecting, as a state of the performance action, position coordinates of the performance appliance on an image plane of the image every time the performance action is played with the performance appliance, the position coordinates being detected by a position sensor;
   detecting an amount of shift of each of the position coordinates detected by the position sensor from a target position defined in a predetermined performance area;
   calculating a sum of the amounts of the shifts from the target position of a predetermined number of the performance actions, and judging one of a plurality of predetermined ranges within which the sum belongs, wherein each of the plurality of predetermined ranges represents a skill level based on a degree of a performance action variation;
   notifying a judgment result of the degree of skill; and
   displaying the position coordinates of each performance action as plane coordinates on a display device by being superimposed on an image illustrating concentric circles about a center point corresponding to the target position of the performance area.

3. A non-transitory computer readable storage medium having stored thereon a program which causes a computer used as a skill judging device to execute functions comprising:
   instructing generation of a predetermined musical sound to a sound output unit, every time a performance action is played with a performance appliance;
   capturing an image of the performance appliance as a subject, and detecting, as a state of the performance action, position coordinates of the performance appliance on an image plane of the image every time the performance action is played with the performance appliance, the position coordinates being detected by a position sensor;
   detecting an amount of shift of each of the position coordinates detected by the position sensor from a target position defined in a predetermined performance area;
   calculating a sum of the amounts of the shifts from the target position of a predetermined number of the performance actions, and judging one of a plurality of predetermined ranges within which the sum belongs, wherein each of the plurality of predetermined ranges represents a skill level based on a degree of a performance action variation;
notifying a judgment result of the degree of skill; and
displaying the position coordinates of each performance action as plane coordinates on a display device by being superimposed on an image illustrating concentric circles about a center point corresponding to the target position of the performance area.

* * * * *